US011098565B2

(12) United States Patent
Hilpert et al.

(10) Patent No.: US 11,098,565 B2
(45) Date of Patent: Aug. 24, 2021

(54) METHOD FOR ESTIMATING PERMEABILITY OF FRACTURED ROCK FORMATIONS FROM INDUCED SLOW FLUID PRESSURE WAVES

(71) Applicant: The Johns Hopkins University, Baltimore, MD (US)

(72) Inventors: Markus Hilpert, Baltimore, MD (US); Peter Anderson Geiser, Lyons, CO (US); Bruce D. Marsh, Hunt Valley, MD (US)

(73) Assignee: The John Hopkins University, Baltimore, MD (US)

( * ) Notice: Subject to any disclaimer, the term of this patent is extended or adjusted under 35 U.S.C. 154(b) by 267 days.

(21) Appl. No.: 16/207,737

(22) Filed: Dec. 3, 2018

(65) Prior Publication Data

US 2019/0178070 A1 Jun. 13, 2019

Related U.S. Application Data

(63) Continuation of application No. 15/224,046, filed on Jul. 29, 2016, now Pat. No. 10,145,227.

(Continued)

(51) Int. Cl.
*E21B 43/26* (2006.01)
*G01V 1/30* (2006.01)
*E21B 49/00* (2006.01)

(52) U.S. Cl.
CPC ............ *E21B 43/26* (2013.01); *E21B 49/00* (2013.01); *G01V 1/306* (2013.01); *G01V 2210/1234* (2013.01); *G01V 2210/6246* (2013.01)

(58) Field of Classification Search
CPC ......... E21B 43/26; E21B 49/00; G01V 1/306; G01V 2210/6246; G01V 2210/1234
(Continued)

(56) References Cited

U.S. PATENT DOCUMENTS 5,251,286 A 10/1993 Wiener et al.
5,517,854 A * 5/1996 Plumb ................... E21B 49/008
73/152.59
(Continued)

OTHER PUBLICATIONS

Stoll et al., Reflection of acoustic waves at a water-sediment interface, (1981) Journal of the Acoustical Society of America, 70, 149-156.
(Continued)

*Primary Examiner* — Daniel L Murphy
(74) *Attorney, Agent, or Firm* — Harrity & Harrity, LLP

(57) ABSTRACT

An embodiment in accordance with the present invention includes a method for estimating the permeability of fractured rock formations from the analysis of a slow fluid pressure wave, which is generated by pressurization of a borehole. Wave propagation in the rock is recorded with TFI™. Poroelastic theory is used to estimate the permeability from the measured wave speed. The present invention offers the opportunity of measuring the reservoir-scale permeability of fractured rock, because the method relies on imaging a wave, which propagates through a large rock volume, on the order of kilometers in size. Traditional methods yield permeability for much smaller rock volumes: well logging tools only measure permeability in the vicinity of a borehole. Pressure transient testing accesses larger rock volumes; however, these volumes are much smaller than for the proposed method, particularly in low-permeability rock formations.

20 Claims, 6 Drawing Sheets

Related U.S. Application Data

(60) Provisional application No. 62/199,290, filed on Jul. 31, 2015.

(58) Field of Classification Search
USPC .......................................................... 367/25
See application file for complete search history.

(56) References Cited

U.S. PATENT DOCUMENTS

| | | | |
|---|---|---|---|
| 6,047,595 | A | 4/2000 | Herron et al. |
| 6,140,816 | A | 10/2000 | Herron |
| 7,562,723 | B2 * | 7/2009 | Reitsma .................. E21B 21/08 175/72 |
| 9,389,326 | B2 | 7/2016 | Vermilye et al. |
| 10,145,227 | B2 | 12/2018 | Hilpert et al. |
| 2004/0108110 | A1 | 6/2004 | Zupanick |
| 2009/0005995 | A1 | 1/2009 | Tang |
| 2009/0299637 | A1 | 12/2009 | Dasgupta |
| 2012/0125617 | A1 * | 5/2012 | Gu ........................... E21B 43/26 166/308.1 |
| 2013/0215712 | A1 | 8/2013 | Geiser |
| 2014/0083681 | A1 | 3/2014 | Taylor |

OTHER PUBLICATIONS

Simm, Practical Gassmann fluid substitution in sand/shale sequences, (2007) First Break, 25, 61-68.

Jizba, Mechanical and Acoustical Properties of Sandstones and Shales, (1991) PhD Thesis, Department of Geophysics and the Committee on Graduate Studies of Sandford University.

Latief et al., Permeability and Tortuosity Anisotropy of a Fractured Porous Rock, (2015) international Workshop on Rock Physics, 1-8.

International Search Report for Application No. PCT/US2016/044820, dated Oct. 6, 2016, 7 pages.

* cited by examiner

METHOD FOR ESTIMATING PERMEABILITY OF FRACTURED ROCK FORMATIONS FROM INDUCED SLOW FLUID PRESSURE WAVES

RELATED APPLICATIONS

This application is a continuation of U.S. patent application Ser. No. 15/224,046, filed Jul. 29, 2016 (now U.S. Pat. No. 10,145,227), which claims the benefit of priority under 35 U.S.C. § 119(e) to U.S. Provisional Application No. 62/199,290, filed on Jul. 31, 2015, the disclosures of which are incorporated herein by reference in their entirety.

FIELD OF THE INVENTION

The present invention relates generally to geophysical exploration. More particularly, the present invention relates to a method for estimating the permeability of the transmissive fracture network of fractured rock formations from the analysis of a slow fluid pressure wave, which is generated by pressurization of a borehole and imaged with TFI™.

BACKGROUND OF THE INVENTION

Rock permeability is one, if not the most, important parameter to know when it comes to understanding natural and engineered flows in the permeable subsurface. Likewise it is crucial to quantify changes in rock permeability, e.g., due to reservoir stimulation through hydraulic or propellant fracturing. Permeability fields in fractured rock are highly heterogeneous with most of the flow concentrated on transmissive fracture networks. Nonetheless fractures can be rather space-filling, and therefore the transmissive fracture network which predominantly participates in subsurface flow can be rather space filling too. FIG. 1A is a map view of a Tomographic Fracture Image (TFI™) of a space-filling fracture network at the reservoir scale. However, it is also possible that there are localized conduits for fluid flow, which can, for example, be linked to fault zones. FIG. 1B illustrates a graphical view of localized zones with relatively high permeability.

Reservoir-scale permeability is an extremely difficult parameter to measure in the deep subsurface. Rock core permeabilities are not representative of the permeabilities of the reservoir-scale fracture networks, which typically exceed the matrix permeability of the cores by orders of magnitude. Pumping tests [e.g., pressure transient analysis (PTA)], in which fluid is injected or withdrawn from a well while changes in borehole pressure are monitored, are not reliable for the low permeabilities often encountered at depth or yield a permeability that is representative only for a small rock volume in the vicinity of the borehole.

Recent advances in rock imaging technology now allow not only mapping the fracture network in the deep subsurface but also identifying dominant flow paths associated with transmissive fracture/fault systems. This is possible through the usage of TFI™, which processes passive seismic data from buried and surface based seismic networks via Seismic Emission Tomography (SET). TFI™ can be used to image directly the dynamic behavior of fracture/fault systems at scales ranging from 10 meters to kilometers. Therefore TFI™ generates five dimensional (5D) semblance data, i.e., the 3D position, time, and seismic energy. TFI™ has, for example, been used to monitor fracture growth during hydraulic fracturing.

Using TFI™, it has been possible to observe slow fluid pressure waves induced by pressurization of a borehole due to the injection of slurries. These so-called Pf waves propagate with a speed on the order of 10 m/s through the transmissive fracture/fault network. The rock domain, which the Pf wave excites, is associated with high-permeability zones within the transmissive fracture network. Due to the small velocity of the Pf waves, it is clear that they are not regular compressional or shear waves, which in natural subsurface environments have velocities on the order of one thousand m/s (e.g., 500 m/s; 1,000 m/s; 2,000 m/s; etc.). So far, a theoretical explanation for the Pf wave has not been provided. Therefore, it is currently not possible to determine rock parameters from the measured speed and attenuation of the Pf wave.

Accordingly, there is a need in the art for a method to estimate the permeability of fractured rock formations from the analysis of a slow fluid pressure wave.

SUMMARY OF THE INVENTION

The foregoing needs are met, to a great extent, by the present invention which provides a method of estimating permeability of fractured rock formations. The method includes generating a Pf wave in a perforated portion of a borehole within the rock formation for the purpose of permeability determination for the fractured rock formation. The method also includes imaging of the Pf wave with TFI™ and analyzing TFI™ data in order to determine the transmissive fracture network, in which the Pf wave propagates as well as the front position of the Pf wave as a function of time within this network. The method includes analyzing the front position data in order to determine the speed of the Pf wave as a function of 3D position over time within the rock formation. The method also includes using poroelastic theory to estimate the 3D permeability field from the 3D field for the Pf wave speed.

In one aspect, the present disclosure provides a method of estimating permeability of a rock formation that includes the steps of generating, by a signal generator, a pressure (Pf) wave in a perforated portion of a borehole within the rock formation; imaging, by an imaging device, the Pf wave to produce imaging data; analyzing, by a controller, the imaging data to identify a front position of the Pf wave as a function of time and to formulate a transmissive fracture network in which the Pf wave propagates; determining the speed of the Pf wave as a function of three dimensional (3D) position within the rock formation based on the front position data; and establishing an estimated 3D permeability field from the 3D field for the Pf wave speed using poroelastic theory.

In one embodiment, the signal generator is borehole pressurization. In one embodiment, the borehole pressurization results from injection of a liquid, a gas, or a supercritical fluid into the borehole. In one embodiment, the liquid is selected from the group consisting of water, isopropyl alcohol, two-butoxyethanol, ethylene glycol, and a slurry.

In one embodiment, the imaging device is a Tomographic Fracture Imaging ("TFI™") device or a Seismic Emission Tomography (SET) device. In one embodiment, the TFI™ device comprises a surface array or a sub-surface array. In one embodiment, the surface array is a beam forming surface array. In one embodiment, the sub-surface array is positioned 1-10 meters below the surface. In one embodiment, the poroelastic theory is Biot's theory.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIG. 3A illustrates that first the entire ambient fracture network is mapped by processing passive seismic data with TFI™. Shown here are the central surfaces of the fracture network. FIG. 3B illustrates that the transmissive fracture network is then illuminated by increasing the borehole pressure, which induces a Pf wave. The recorded 5D semblance data is used to determine the arrival times of the Pf wave front in the fractures. Only fractures that form the transmissive fracture network are shown. The color of a fracture indicates the travel time of the Pf wave. FIG. 3C illustrates that from the travel time field, the velocity of the Pf wave is calculated. FIG. 3D illustrates that 5D semblance data from the passive seismic imaging is used to identify the permeable damage zones (shown in gray) around the central surfaces of the fracture network, because these zones also carry fluid flow. This rock volume contains the dominant flow paths and forms the transmissive fracture network. FIG. 3E illustrates using Biot theory, permeability in the transmissive fracture network is estimated from the Pf wave velocity.

DETAILED DESCRIPTION

Figure 1B:
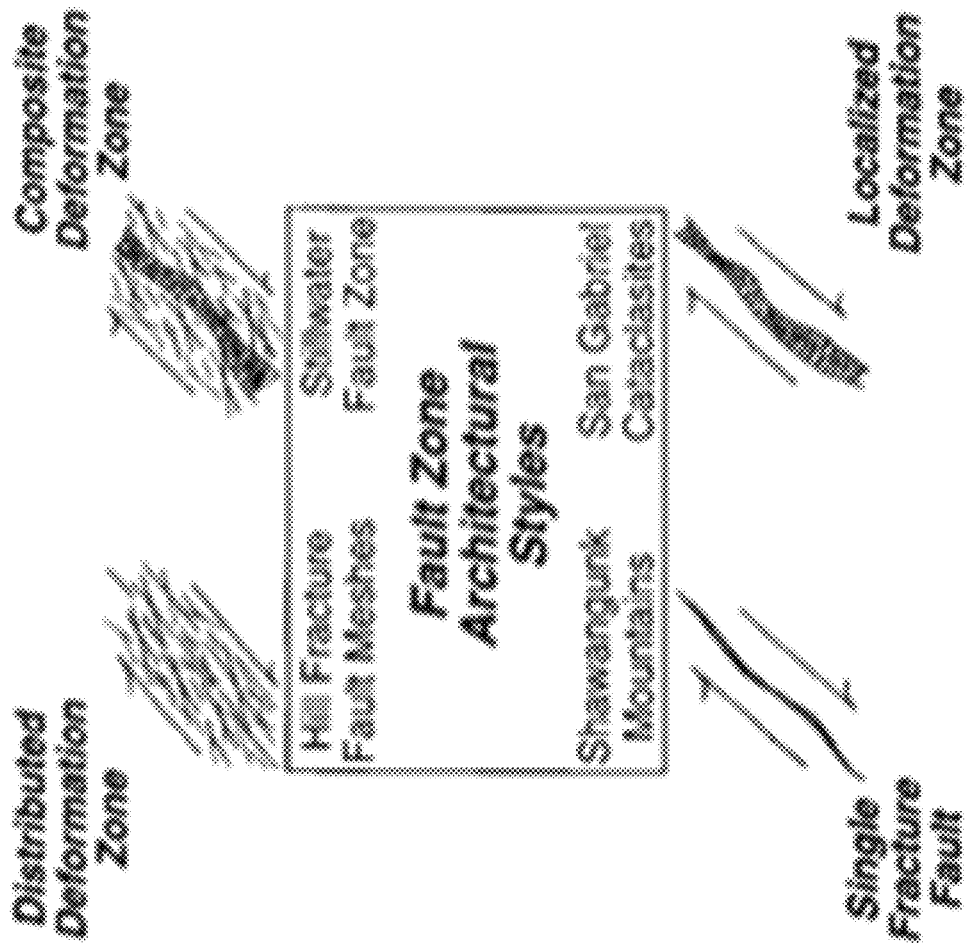
FIGS. 1A-1B illustrate a map view image of a space-filling fracture network that has been imaged with TFI™ and a graphical view of localized zones with relatively high permeability that could appear in fault zones, respectively.
Figure 1A:
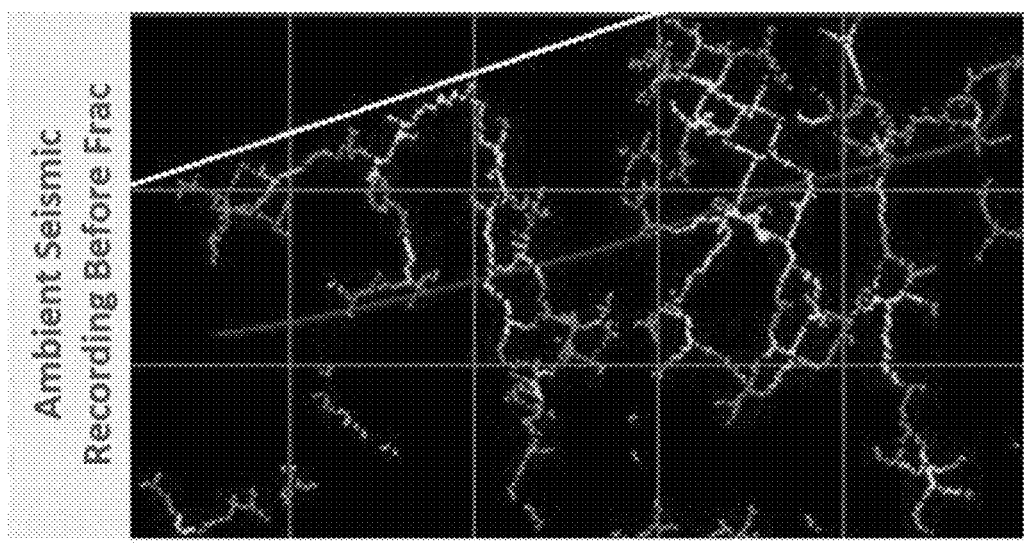

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention is based, at least in part, on the discovery that the permeability of reservoir scale (e.g., about 1-10 km in size) geological features and/or transmissive fractures/faults may be estimated by using a signal generator to produce a slow fluid wave that emanates omni-directionally from the signal generator, imaging the slow fluid wave in three dimensions using a geological imaging device/technique (e.g., TFI™), identifying the wave front of the slow fluid wave in three dimensions, calculating the velocity of the wave front in all three dimensions as the slow fluid wave moves outwardly through the geological features and/or transmissive fractures/faults, and analyzing the wave front velocity in three dimensions with a poroelastic theory (e.g., Biot's theory) to calculate permeabilities throughout the geological feature.

Tomographic Fracture Imaging ("TFI™") is an imaging method that combines Seismic Emission Tomography (SET) with empirical data on fracture geometry to directly image geological fracture networks (e.g. naturally occurring fracture networks, induced fracture networks, and the like). SET is a technique that may identify sources of seismic energy contained within the volume of the geological feature (e.g. a reservoir) being imaged as described in, for example, U.S. Pat. No. 9,389,326 (incorporated herein by reference in its entirety). The seismic energy may be recorded by a sensor array (e.g., a beam forming surface array) and collected and processed to provide a three dimensional (3D) grid of voxels. The semblance value for the seismic energy associated with each voxel may then be calculated and assigned to a node point and then color contoured for semblance value. Advantageously, the seismic data for TFI™ may be collected by a surface array, which enables it to be used to map fracture networks at both the well and reservoir level scale with a high level of resolution. It is also contemplated within the scope of the invention that the seismic data for TFI™ may be collected by a shallow sub-surface sensor array (e.g., a sensor array that has been buried below the surface). In an exemplary embodiment, such a sub-surface sensor array may be positioned 1-100 meters below the surface, or in some cases even deeper.

An embodiment in accordance with the present invention includes a method for estimating the permeability of fractured rock formations from the analysis of a slow fluid pressure wave, which may be generated by pressurization of a borehole. In this regard, borehole pressurization may be used as a signal generator to create the slow fluid pressure wave. Typically, a borehole may be pressurized by injecting any fluid such as, for example, water, isopropyl alcohol, two-butoxyethanol, ethylene glycol, liquid nitrogen, or a slurry. It is also contemplated within the scope of the invention that a borehole may be pressurized by injecting a supercritical fluid such as, for example, supercritical carbon dioxide. Is also contemplated within the scope of the invention that a borehole may be pressurized with a gas such as, for example, atmospheric air, oxygen, nitrogen, carbon dioxide, and the like. The specific signal generator may be matched to the geological composition of the reservoir being analyzed. For example, the signal generator may be a gas in the case of a reservoir composed primarily of a gas such as natural gas or methane, while the signal generator may be a fluid or a supercritical fluid for a reservoir composed primarily of a liquid such as, for example, oil. Without being bound by theory, it is believed that matching the type of signal generator to the geological composition of the reservoir being analyzed may increase the quality and/or resolution of the data that results from the imaging of the Pf wave.

Wave propagation in the rock may be recorded with an imaging technique (such as, e.g., TFI™, SET, and the like) or a pressure monitoring technique (such as, e.g., direct measurement of pore fluid pressure with a pressure sensor deployed into a preexisting or newly drilled borehole). Poroelastic theory may then be used to estimate the permeability of the fractured rock formations from the measured wave speed. Advantageously, the present invention makes it possible to measure the permeability of fractured rock at reservoir-scale because the imaged pressure wave is able to propagate through a large rock volume, on the order of kilometers in size (e.g., 1-10 km). This is in stark contrast to traditional methods, which yield permeability measurements for much smaller rock volumes. For example, well logging tools only measure permeability in the vicinity of a borehole. Pressure transient testing accesses larger rock volumes; however, these volumes are much smaller than those enabled by the present invention, particularly in low-permeability rock formations. Another advantage of the present invention is that the signal generator may be, for example, fluid pumped into an existing borehole to allow assessment of permeability of an undisturbed reservoir (e.g., a natural reservoir that has not been subjected to artificial fracturing), or an artificially fractured reservoir (e.g., a natural reservoir that has been subjected to hydraulic fracturing, propellant fracking, or other rock stimulation methods). It is contemplated within the scope of the invention that the signal generator may be, for example, a slurry used during the process of hydraulic fracturing so that the permeability of an exemplary reservoir may be assessed at the same time that it is subject to fracturing.

Figure 2:
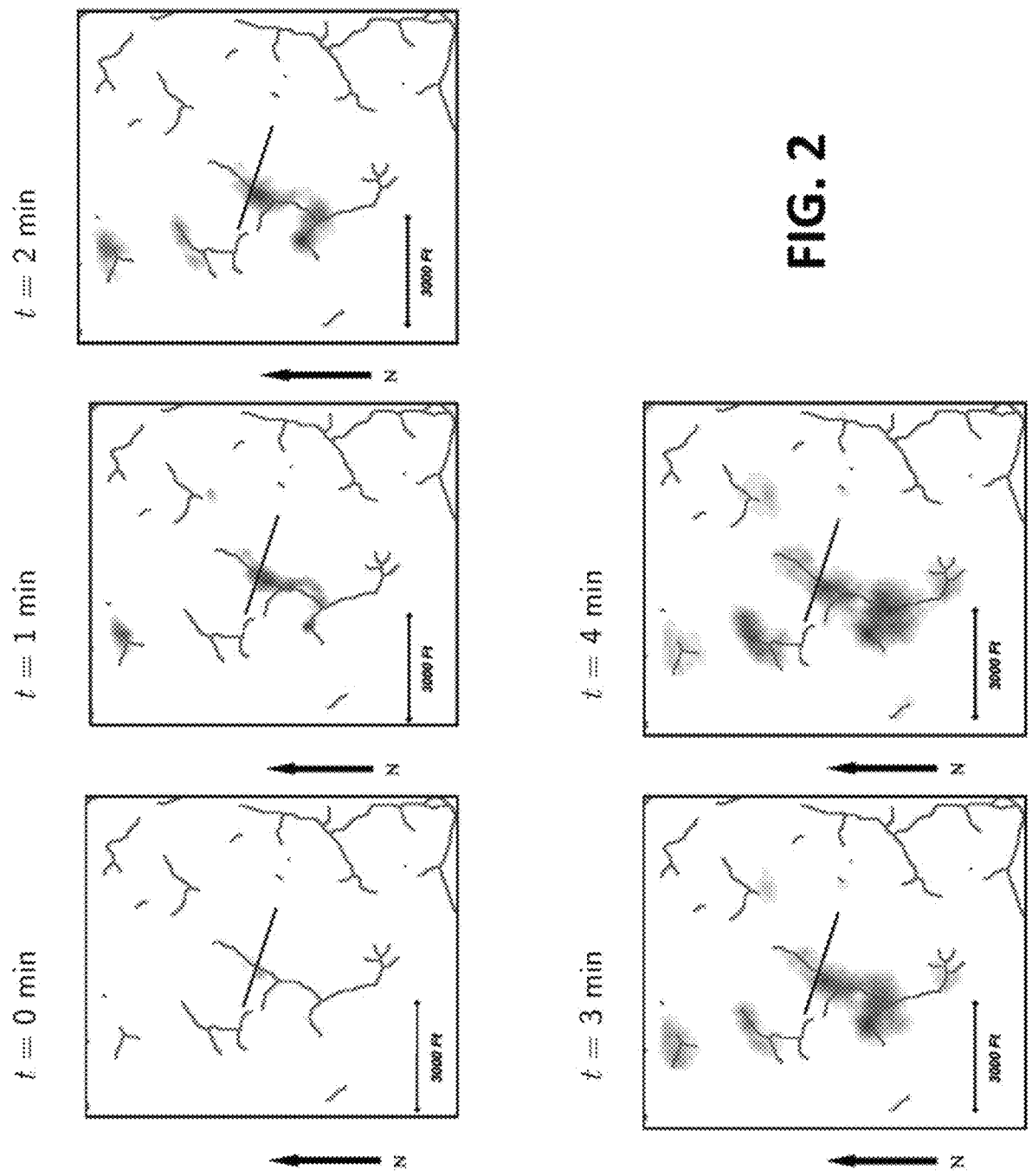
FIG. 2 shows a series of map view TFI™ images of a Pf wave in the Barnett Shale. The five map views show the semblance for five different times. The gray-scale stands for the magnitude of semblance, with black and white indicating high and low values. The images show that the Pf wave travels about 5,000 ft in 3 minutes, which corresponds roughly to a velocity of 6.3 m/s.

The present invention provides an explanation of the physical mechanisms that give rise to the Pf wave, and demonstrates that this physical understanding may be used to estimate the permeability of the transmissive fracture network. According to the techniques herein, several field data sets show Pf waves observed via TFI™, and the Pf wave corresponds to Biot's Slow Wave. In this regard, the Biot theory may be used to estimate the permeability of the fracture networks in which the Pf waves were observed. FIG. 2 illustrates graphical views of Pf wave in the Barnett Shale. The plots suggest that the wave travels about 5,000 ft in 3 minutes, which corresponds roughly to a velocity of 6.3 m/s.

The method of the present invention includes several steps for deriving/estimating subsurface formation permeability. One step includes creation of a 3D model for seismic velocity of the rock formation under consideration. The velocity model can be constructed from sonic logs, geological models, Vertical Seismic Profiles (VSPs), crosswell tomography, seismic tomography, and the like. Another step may include installation of a surface or buried seismic array for TFI™ at the field site. Collection of passive-seismic data with the seismic array may be used to image the preexisting fracture system.

Figure 3A:
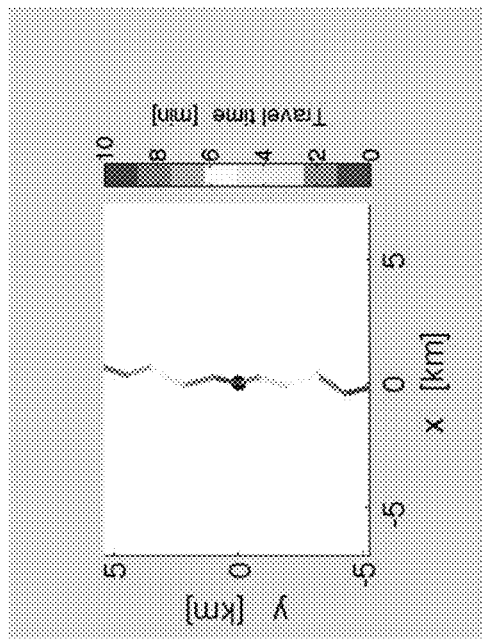
FIGS. 3A-3E illustrate graphical views of how TFI™ data is processed in order to determine the permeability of the transmissive fracture network.

Using the 3D velocity model, the passive seismic data may be processed via TFI™ in order to create a 3D image of the seismically active fracture system. FIG. 3A illustrates a graphical view of an ambient fracture network that has been mapped by processing passive seismic data with TFI™.

A well may be drilled into the imaged rock formation, for which a permeability estimate is sought. In an exemplary embodiment, the well may be vertically oriented. Due to the attenuation of the Pf wave, it is preferable that the well be located in the center of the formation such that sufficiently high pressure perturbations can be created everywhere within the geological domain of interest.

Figure 4:
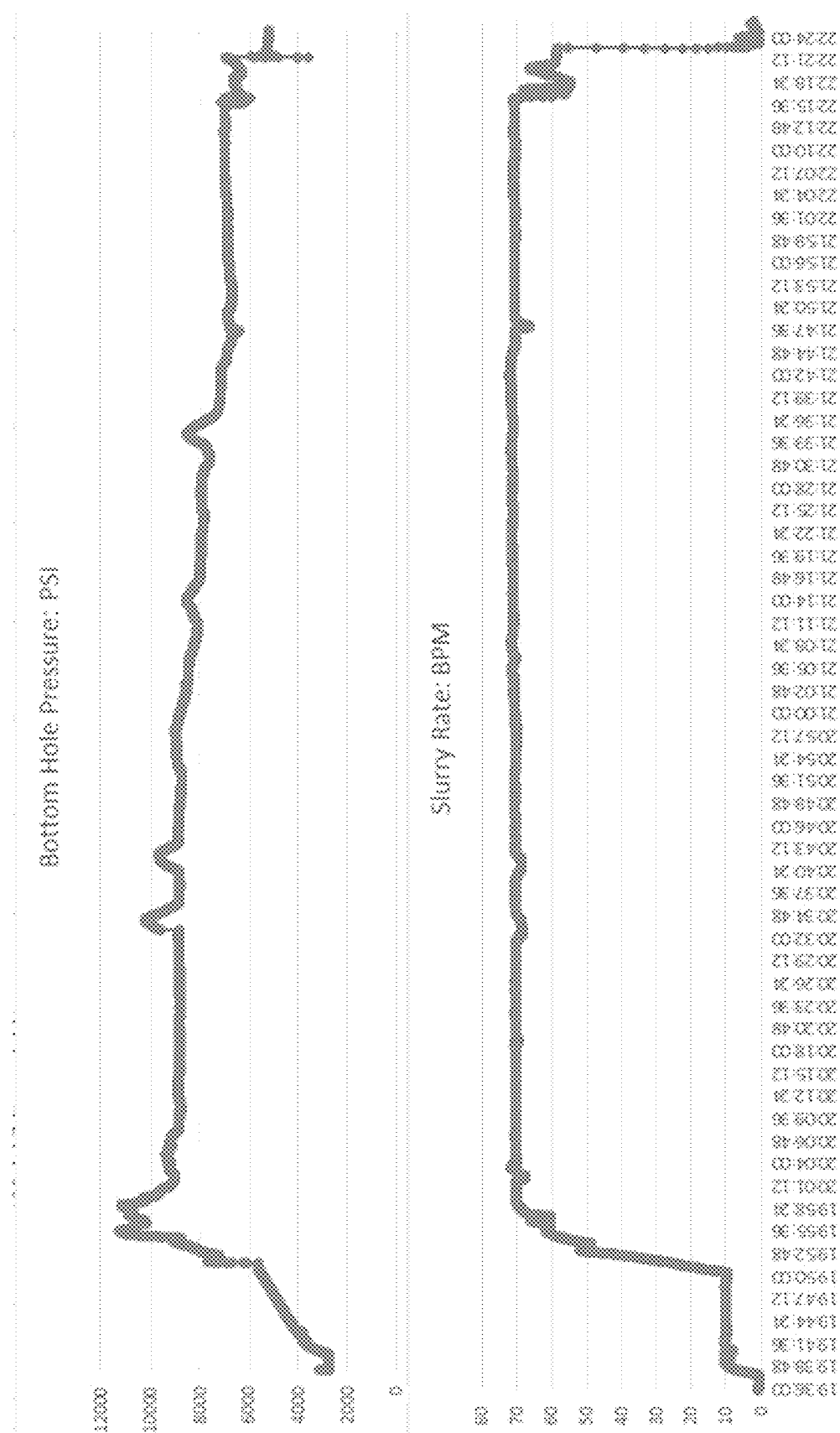
FIG. 4 illustrates graphical views of the bottom borehole pressure $p_b$ and flow rate as a function of time as observed during hydraulic fracturing.

Fluid may be injected into the borehole for some period of time at a rate such that the bottom borehole pressure increases substantially. At the same time, the rock formation is imaged with TFI™ in order to determine the fracture system that is stimulated by the generated pressure wave. While TFI™ is disclosed herein as an exemplary imaging modality, any suitable imaging system known to or conceivable by one of skill in the art could also be used. Also, the bottom borehole fluid pressure $p_b$ is recorded as a function of time t in order to characterize the transient behavior of the source of the Pf wave. However, it is also contemplated within the scope of the invention that other variables (e.g., acceleration) could be measured in order to characterize the source of the Pf wave. FIG. 4 illustrates graphical views of borehole pressure data shows typical bottom borehole pressure data that is obtained when a slurry is injected into the well for the purposes of hydraulic fracturing.

Figure 3B:
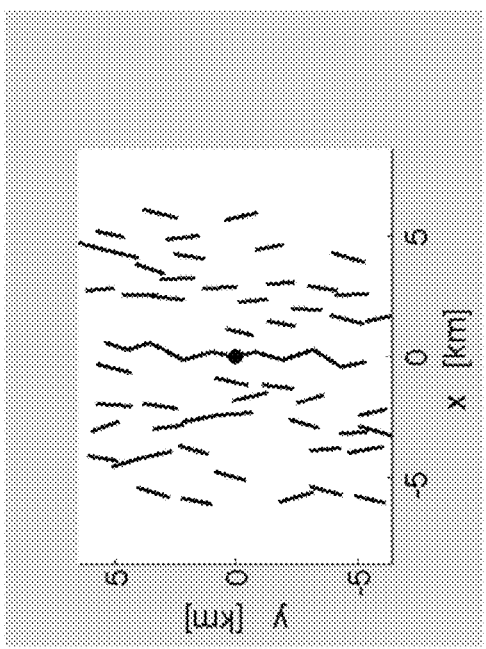

The seismic data is processed via TFI™ in order to achieve 5D semblance data that describes the propagation of the induced pressure disturbance. The recorded 5D semblance data is used to determine the arrival time of the Pf wave front at the central surfaces of the transmissive fracture network. To that end, the data likely first need to be denoised (e.g. using anisotropic diffusion filtering), and then the front will be highlighted (e.g., using edge detection or image segmentation). FIG. 3B illustrates a graphical view of the transmissive fracture network which is illuminated by increasing the borehole pressure.

Figure 3C:
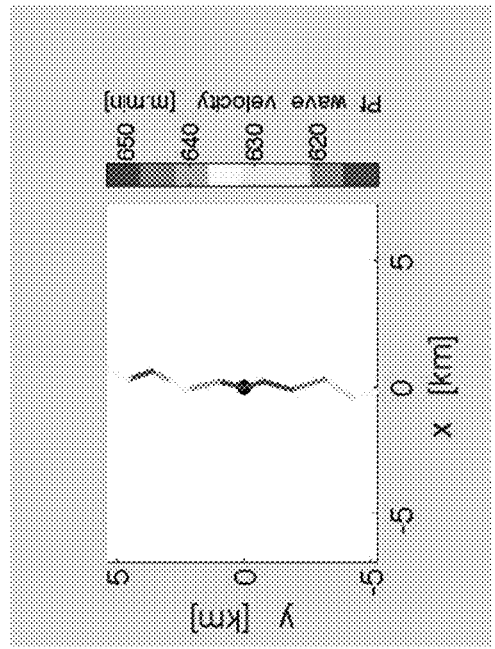
Figure 3E:
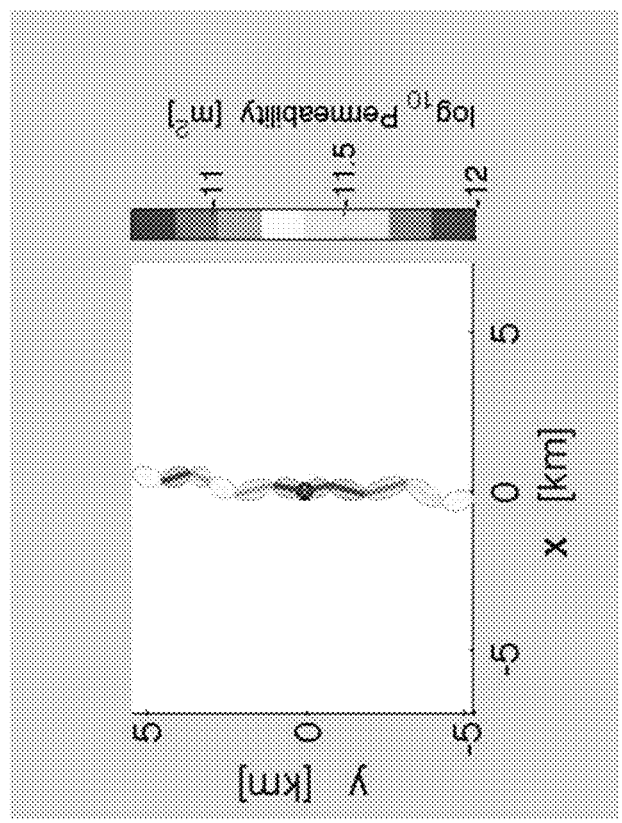
Figure 3D:
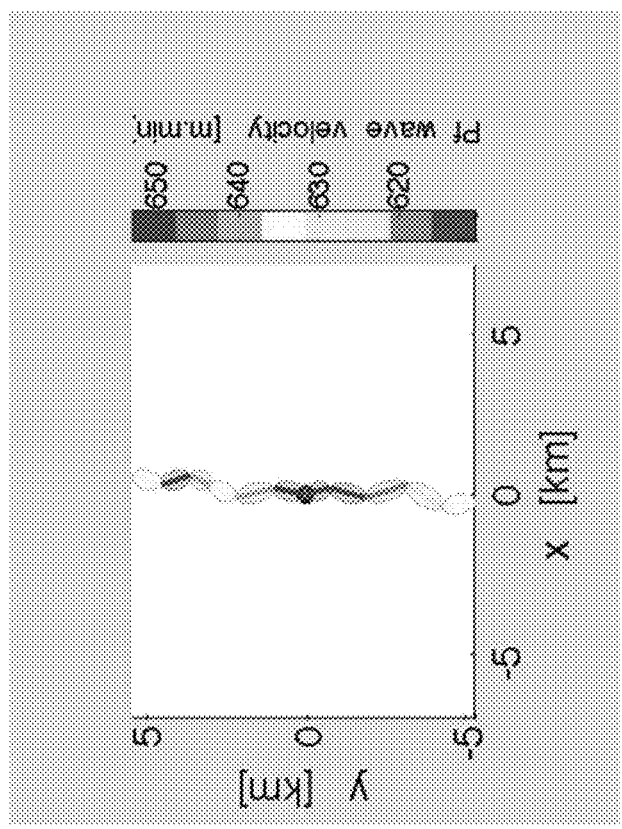

From the travel time on the central surfaces of the transmissive fracture network, the velocity of the Pf wave on the central surfaces of the transmissive fracture network is calculated. FIG. 3C illustrates a graphical view of the velocity field of the Pf wave. 5D semblance data from the passive seismic imaging is used to identify the permeable zones around the central surfaces. The rock volume in these zones contains the dominant flow paths and forms the transmissive fracture network. FIG. 3D illustrates a graphical view of the 5D semblance data from the passive seismic imaging that is used to identify the permeable zones around the major fractures.

Poroelastic theory according to Biot is used to estimate the permeability of the transmissive fracture network, k. Biot developed a theory in order to describe the propagation of elastic waves in fluid-saturated porous media. The Biot theory has been modified using the notation introduced by Stoll and Kan (R. D. Stoll and T. K. Kan. Reflection of acoustic waves at a water-sediment interface. Journal of the Acoustical Society of America, 70: 149-156, 1981) and Stoll (R. D. Stoll. Sediment Acoustics. Springer-Verlag, New York, 1989) to model parameters directly related to typical rock properties. In this regard, Biot's theory may be presented in the form of the following two partial differential equations:

$$\nabla^2 (He - C\zeta) = \frac{\partial^2}{\partial t^2}(\rho e - \rho_f \zeta) \qquad (1)$$

$$\nabla^2 (Ce - M\zeta) = \frac{\partial^2}{\partial t^2}\left(\rho_f e - \alpha \frac{\rho_f}{\beta}\zeta\right) - \frac{\eta}{k}\frac{\partial \zeta}{\partial t} \qquad (2)$$

where the volumetric strain e [–] and the increment in fluid content $\zeta$ [–] are the unknowns. The fluid pressure $p_f$ can be obtained from the primary dependent variables via $$p_f = M\zeta - Ce \qquad (3)$$

These equations including the lumped parameters H, C and M depend on the following 11 parameters:
1. the porosity of the rock, β [-];
2. the dynamic viscosity of the fluid, η [kg m$^{-1}$ s$^{-1}$];
3. the total mass density of the fluid-saturated porous medium, ρ [kg m$^{-3}$];
4. the density of the fluid, $\rho_f$ [kg m$^{-3}$];
5. the permeability of the fractured rock, k [m$^2$];
6. the shear modulus of the rock, μ [m$^2$];
7. the bulk modulus of the fluid, $K_f$ [Pa];
8. the bulk modulus of the solid material that makes up the rock that differs from the bulk modulus of the porous/fractured rock, $K_r$ [Pa];
9. the bulk modulus of the free-draining porous/fractured rock, $K_b$ [Pa];
10. a pore-size parameter a [m]; and
11. a factor that accounts for the tortuosity of the rock, α≥1 [-].

The lumped parameters are defined as follows:

$$H = \frac{(K_r - K_b)^2}{D - K_b} + K_b + \frac{4}{3}\mu \tag{4}$$

$$C = \frac{K_r(K_r - K_b)}{D - K_b} \tag{5}$$

$$M = \frac{K_r^2}{D - K_b} \tag{6}$$

$$D = K_r\left[1 + \beta\left(\frac{K_r}{K_f} - 1\right)\right] \tag{7}$$

The problem may be assessed in Fourier space where the solutions represent harmonic waves that oscillate in time with an angular frequency ω and in space with a complex wave number l:

$$e(x,t) = B_1 e^{i(\omega t - lx)} \tag{12}$$

$$\zeta(x,t) = B_2 e^{i(\omega t - lx)} \tag{13}$$

It is convenient to introduce a vector for the unknowns e and ζ:

$$\vec{y}(x,t) = \begin{pmatrix} e(x,t) \\ \zeta(x,t) \end{pmatrix} = \begin{pmatrix} B_1 \\ B_2 \end{pmatrix} e^{i(\omega t - lx)} = \vec{B} e^{i(\omega t - lx)} \tag{14}$$

By substituting these assumed solutions into Equations (1) and (2), one can show that the following condition must be fulfilled:

$$\begin{vmatrix} \overline{H}l^2 - \rho\omega^2 & \rho_f\omega^2 - \overline{C}l^2 \\ \overline{C}l^2 - \rho_f\omega^2 & m\omega^2 - \overline{M}l^2 - i\omega F\eta/k \end{vmatrix} = 0 \tag{15}$$

where $$F(\kappa) = \frac{1}{4} \frac{\kappa T(\kappa)}{1 - \frac{2T(\kappa)}{i\kappa}} \tag{16}$$

is a function which accounts for deviations of Darcy's law in case of ω>0, $$T(\kappa) = \frac{ber'(\kappa) + i bei'(\kappa)}{ber(\kappa) + i bei(\kappa)} \tag{7}$$

is a nondimensional function, and $$\kappa = a\sqrt{\frac{\omega \rho_f}{\eta}} \tag{18}$$

is a nondimensional frequency. Equation (15) can be used to determine the dispersion relation between the complex wave number l and the real angular frequency ω. This dispersion relation allows one to calculate the phase velocity and the attenuation of a harmonic wave. Equation (15) can be written as a fourth-order polynomial in l:

$$0 = \lambda^2 \underbrace{(C^2 - HM)}_{:=a_2} + \lambda \underbrace{\left(Hm\omega^2 - iH\frac{\omega F\eta}{k} - 2\rho_f\omega^2 C + \rho M\omega^2\right)}_{:=a_1} + \underbrace{\rho_f^2\omega^4 - \rho m\omega^4 + i\rho\frac{\omega^3 F\eta}{k}}_{:=a_0} \tag{19}$$

where $\lambda = l^2$. The two solutions to this quadratic equation in λ are given by $$\lambda = \frac{-a_1 \pm \sqrt{a_1^2 - 4a_0 a_2}}{2a_2} \tag{20}$$

The two λ values correspond to Biot's first and second compressional wave. They have different phase velocities and attenuation coefficients. The complex wave number is obtained by taking the square root of each λ value. The two roots that one obtains for each λ value, $l_1 = l_r + il_i$ and $l_2 = -il_1$, represent one and the same dispersion relation. They correspond to two waves which travel with the same absolute speed into either the positive or the negative x-direction and which experience the same attenuation/growth along the direction of propagation. From Equation (15), it is also possible to calculate $$\vec{B}(\omega) = \begin{pmatrix} \rho_f\omega^2 - Cl^2 \\ \rho\omega^2 - Hl^2 \end{pmatrix} \tag{21}$$

where l(ω) is known from the dispersion relation. Due to the linearity of the governing equations, this vector can be multiplied by any complex number. For each location x, the $\vec{B}$ vector gives according to Equation 14 information about the ratio of the amplitudes of the e and ζ oscillations and the phase shift between them.

From the dispersion relation, one can determine the velocity of a localized wave package, which is characterized by a dominant frequency ωc. In case of attenuation, this dominant frequency changes with time t, because the different harmonics which make up a wave package die out at different rates. In case of attenuation, the group velocity dω/dl as defined for the case without attenuation becomes complex, because l is complex. The real and imaginary parts of the group velocity can be related to the position of the spatial maximum of the wave package, $$x_M(t) = \text{Re}\left\{\frac{d\omega}{dl}\bigg|_{l_M}\right\}t \qquad (22)$$

and the central wave number $$l_M(t) = l_c + \Delta^2 \text{Im}\left\{\frac{d\omega}{dl}\bigg|_{l_M}\right\}t \qquad (23)$$

where $\Delta$ is the width of the assumed initial Gaussian wave package. Thus the group velocity is given by $$v_g = \text{Re}\left\{\frac{d\omega}{dl}\bigg|_{l_M}\right\} \qquad (24)$$

The group velocity changes with time because the central wave number $l_M$ changes with time according to Eq. (23).

All parameters of the Biot theory, except for the permeability k which is to be determined inversely, can be estimated for an exemplary gas shale reservoir. Shale generally has a porosity between 0 and 10%, so it is possible to estimate $\beta=0.05$. In a gas shale reservoir the fluid may typically be assumed to be methane, even though actual shale gas is a gas mixture. At 0° C. (freezing point of water) and 101.3 kPa (atmospheric pressure), methane has a viscosity $\eta=10.2\times10^{-6}$ kg m$^{-1}$ s$^{-1}$. Typical values of reservoir pressures range from 20 to 50 MPa; therefore, a gas pressure of 20 MPa may be assumed. In some instances, the reservoir pressure may be estimated by assuming a hydrostatic pressure distribution in the subsurface, in which case a pressure of 20 MPa corresponds roughly to a reservoir depth of 2 km. It may further be assumed that the reservoir temperature may be calculated from the geothermal gradient (e.g., 22.1° C. per km of depth) and that the ground surface has a temperature of 20° C., then the reservoir temperature is about 64° C. The viscosity of methane may be modeled as $\eta=1.3\times10^{-5}$ kg m$^{-1}$ s$^{-1}$. Densities of most mineral soil materials vary between 2600 and 2750 kg/m$^3$. Even though shale is not a soil, an average value for the total density of shale, $\rho=2675$ kg/m$^3$ may be used (e.g., the small porosity of the shale may be neglected in the modeling). Methane has a specific gas constant R=519 J kg$^{-1}$ K$^{-1}$. Using the ideal gas law, $\rho f=p/(RT)$, $\rho f=114$ kg/m$^3$ is obtained for the pressure and temperature used in the viscosity calculation. A value of $\mu=6.1$ GPa may be set according to Simm (see e.g., R. Simm Practical Gassmann fluid substitution in sand/shale sequences. First Break, 25:61-68, 2007). The bulk modulus is also the inverse of the compressibility. For an ideal gas, the isothermal compressibility is the inverse pressure. Therefore the bulk modulus is the pressure itself, which means $K_f=20$ MPa. $K_r$ [Pa] is the bulk modulus of the solid material that makes up the rock that differs from the bulk modulus of the porous/fractured rock. Note that the bulk modulus is also the inverse of the compressibility. For quartz and most minerals, the compressibility is about $2\times10^{-11}$ Pa$^{-1}$, accordingly, a value of $K_r=5\times10^{10}$ Pa=50 GPa may be assumed. According to Jizba (see e.g., D. L. Jizba. Mechanical and acoustical properties of sandstones and shales. PhD thesis, Stanford University, 1991), the bulk modulus of room-dry shale cores varies between 15 and 35 GPa. Accordingly, the arithmetic mean $K_b=25$ GPa may be used. In an exemplary embodiment, $a=1$ mm may be used for the pore-size parameter.

According to Latief and Fauzi (F. D. E. Latief and U. Fauzi. Permeability and tortuosity anisotropy of a fractured porous rock. pages 1-8, 2015. 3rd International Workshop on Rock Physics, Apr. 13-17, 2015 in Perth, Western Australia), who analyzed a 3D image of a cm-scale igneous rock sample, the tortuosity of fractured rock is on the order of 1.5. Accordingly, a value of $\alpha=1.5$ may be used in an exemplary embodiment.

It is generally possible to obtain independent estimates for all Biot theory parameters of a fluid-saturated fractured rock, except for the permeability k [m$^2$]. These parameters are the following: the porosity of the rock [–], the dynamic viscosity of the fluid [kg m$^{-1}$ s$^{-1}$], the total mass density of the fluid-saturated porous medium [kg m$^{-3}$], the density of the fluid [kg m$^{-3}$], the shear modulus of the rock [Pa], the bulk modulus of the fluid [Pa], the bulk modulus of the solid material that makes up the rock [Pa], the bulk modulus of the free-draining porous/fractured rock [Pa], a pore-size parameter [m], and a factor that accounts for the tortuosity of the rock H.

Biot theory is used to calculate the dispersion relation for Biot's slow wave, i.e., the dependence of the complex wave number l on $\omega$.

The dominant frequency $\omega_c$ of the signal generator is determined by Fourier analysis of the bottom hole pressure $p_b(t)$, or from other variables that characterize the generator/source strength. Using the dispersion relation one can then calculate the corresponding wave number $l_c$. The velocity of the Pf wave is estimated by the group velocity for a package of harmonic slow waves that is characterized by a $$c_g = \text{real}\left\{\frac{d\omega}{dk}\bigg|_{\omega_c}\right\} \qquad (25)$$

Figure 5:
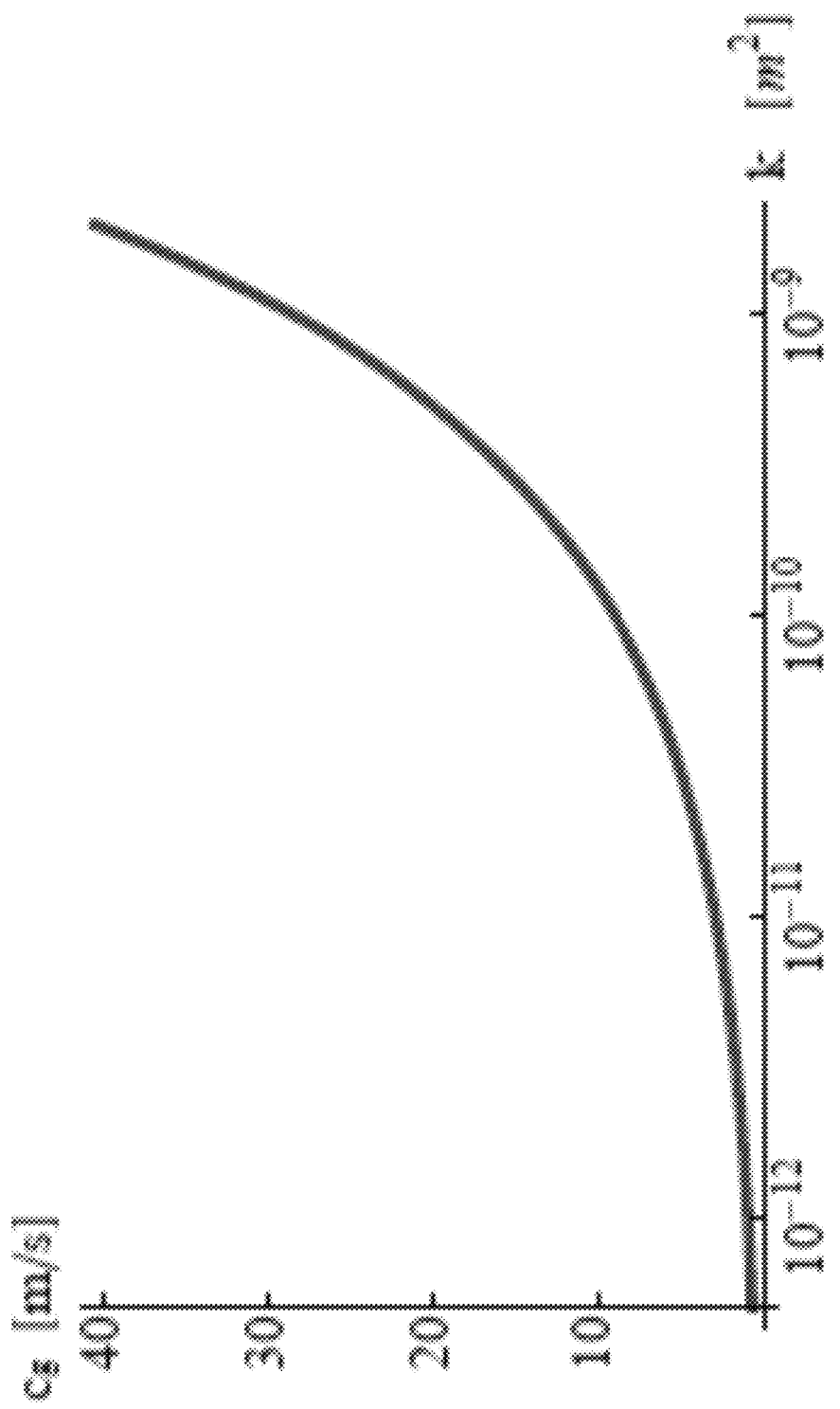
FIG. 5 illustrates a graphical view of the dependence of the group velocity on permeability, which was calculated from Biot's theory for poro-elastic media.

Numerical values for this group velocity cannot be determined because it depends on the unknown permeability k. However, the function that describes the dependence of $c_g$ on k can be numerically determined. FIG. 5 illustrates a graphical view of the dependence of the group velocity on permeability.

The speed of the Pf wave, $c_g$, in the 3D rock volume of the transmissive fracture network is used to calculate the permeability k in the same rock volume. This is done by determining at each point $k(c_g)$ where the latter function is obtained by numerically inverting $c_g(k)$ from Equation (25). FIG. 3E illustrates a graphical view of the calculated permeability field.

It is understood that one or more of the above methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the above methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The steps and analysis of the present invention can be carried out using a computer, non-transitory computer readable medium, or alternately a computing device or non-transitory computer readable medium incorporated into an imaging device. Indeed, any suitable method of calculation known to or conceivable by one of skill in the art could be used. It should also be noted that while specific equations are detailed herein, variations on these equations can also be derived, and this application includes any such equation known to or conceivable by one of skill in the art. A non-transitory computer readable medium is understood to mean any article of manufacture that can be read by a computer. Such non-transitory computer readable media includes, but is not limited to, magnetic media, such as a floppy disk, flexible disk, hard disk, reel-to-reel tape, cartridge tape, cassette tape or cards, optical media such as CD-ROM, writable compact disc, magneto-optical media in disc, tape or card form, and paper media, such as punched cards and paper tape. The computing device can be a special computer designed specifically for this purpose. The computing device can be unique to the present invention and designed specifically to carry out the method of the present invention. The computing device can also take the form of an operating console computer for the imaging device. The operating console is a non-generic computer specifically designed by the scanner manufacturer for bilateral (input output) communication with the scanner. It is not a standard business or personal computer that can be purchased at a local store. Additionally this console computer carries out communications with the scanner through the execution of proprietary custom built software that is designed and written by the scanner manufacturer for the computer hardware to specifically operate the scanner hardware.

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method, comprising:
    imaging, by a device, a fluid pressure wave, generated in a perforated portion of a borehole, to produce imaging data;
    analyzing, by the device, the imaging data to identify a wave front of the fluid pressure wave as a function of time;
    determining, by the device and based on identifying the wave front of the fluid pressure wave as a function of time, a speed at which the wave front of the fluid pressure wave is moving through a geological feature,
    wherein the speed at which the wave front of the fluid pressure wave is moving through the geological feature is determined as a function of a three dimensional (3D) position; and
    determining, by the device and using poroelastic theory, a 3D permeability field for the geological feature based on determining the speed of at which the wave front of the fluid pressure wave is moving through the geological feature.

2. The method of claim 1, further comprising:
    generating the fluid pressure wave by injecting a fluid into the borehole.

3. The method of claim 2, wherein the fluid is at least one of:
    a liquid,
    a gas, or
    a supercritical fluid.

4. The method of claim 1, further comprising:
    determining a bottom borehole fluid pressure as a function of time; and
    characterizing, based on determining the bottom borehole fluid pressure as a function of time, a transient behavior of a source of the fluid pressure wave.

5. The method of claim 1, further comprising:
    determining an acceleration of the wave front of the fluid pressure wave; and
    characterizing, based on determining the acceleration of the wave front of the fluid pressure wave, a transient behavior of a source of the fluid pressure wave.

6. The method of claim 1, further comprising:
    processing seismic data via an imaging technique; and
    determining, based on processing the seismic data, an arrival time, of the wave front the fluid pressure wave, at a central surface of a transmissive fracture network.

7. The method of claim 1, further comprising:
    determining a transmissive fracture network based on analyzing the imaging data.

8. A device, comprising:
    a memory; and
    one or more processors to:
        image a fluid pressure wave, generated in a perforated portion of a borehole, to produce imaging data;
        analyze the imaging data to identify a wave front of the fluid pressure wave in three dimensions;
        determine, based on identifying the wave front of the fluid pressure wave, a velocity at which the wave front of the fluid pressure wave is moving through a geological feature in the three dimensions; and
        determine, using a poroelastic theory and based on the velocity at which the wave front of the fluid pressure wave is moving through the geological feature in the three dimensions, a permeability of the fluid pressure wave.

9. The device of claim 8, where the one or more processors, when imaging the fluid pressure wave, are to:
    image the fluid pressure wave using tomographic fracture imaging or seismic emission tomography.

10. The device of claim 8, where the one or more processors, when imaging the fluid pressure wave, are to:
    image the fluid pressure wave using a measurement of pore fluid pressure from a pressure sensor in the borehole.

11. The device of claim 8, where the one or more processors, when imaging the fluid pressure wave, are to:
    image the fluid pressure wave using a measurement of pore fluid pressure from a pressure sensor in another borehole.

12. The device of claim 8, where the one or more processors are further to:
   determine a bottom borehole fluid pressure as a function of time; and
   characterize, based on determining the bottom borehole fluid pressure as a function of time, a transient behavior of a source of the fluid pressure wave.

13. The device of claim 8, where the one or more processors are further to:
   determine an acceleration of the wave front of the fluid pressure wave; and
   characterize, based on determining the acceleration of the wave front of the fluid pressure wave, a transient behavior of a source of the fluid pressure wave.

14. The device of claim 8, where the one or more processors are further to:
   process seismic data via an imaging technique; and
   determine, based on processing the seismic data, an arrival time of the wave front of the fluid pressure wave at a central surface of a transmissive fracture network.

15. A non-transitory computer-readable medium storing instructions, the instructions comprising:
   one or more instructions that, when executed by one or more processors, cause the one or more processors to:
      image a fluid pressure wave, generated in a borehole, to produce imaging data;
      analyze the imaging data to identify a wave front of the fluid pressure wave in three dimensions as a function of time;
      determine, based on identifying the wave front of the fluid pressure wave as a function of time, a speed at which the wave front of the fluid pressure wave is moving through a geological feature as a function of a three dimensional (3D) position; and
      determine, using a poroelastic theory and based on the speed at which the wave front of the fluid pressure wave is moving through the geological feature as a function of the 3D position, a permeability of the fluid pressure wave.

16. The non-transitory computer-readable medium of claim 15, where the one or more instructions, that cause the one or more processors to image the fluid pressure wave, cause the one or more processors to:
   image the fluid pressure wave using:
      tomographic fracture imaging,
      seismic emission tomography,
      a measurement of pore fluid pressure from a pressure sensor in the borehole, or
      a measurement of pore fluid pressure from a pressure sensor in another borehole.

17. The non-transitory computer-readable medium of claim 15, where the one or more instructions, when executed by the one or more processors, further cause the one or more processors to:
   determine a bottom borehole fluid pressure as a function of time; and
   characterize, based on determining the bottom borehole fluid pressure as a function of time, a transient behavior of a source of the fluid pressure wave.

18. The non-transitory computer-readable medium of claim 15, where the one or more instructions, when executed by the one or more processors, further cause the one or more processors to:
   determine an acceleration of the wave front of the fluid pressure wave; and
   characterize, based on determining the acceleration of the wave front of the fluid pressure wave, a transient behavior of a source of the fluid pressure wave.

19. The non-transitory computer-readable medium of claim 15, where the one or more instructions, when executed by the one or more processors, further cause the one or more processors to:
   process seismic data via an imaging technique; and
   determine, based on processing the seismic data, an arrival time of the wave front of the fluid pressure wave at a central surface of a transmissive fracture network.

20. The non-transitory computer-readable medium of claim 15, where the one or more instructions, when executed by the one or more processors, further cause the one or more processors to:
   determine a transmissive fracture network based on analyzing the imaging data.

* * * * *

UNITED STATES PATENT AND TRADEMARK OFFICE
CERTIFICATE OF CORRECTION

PATENT NO. : 11,098,565 B2
APPLICATION NO. : 16/207737
DATED : August 24, 2021
INVENTOR(S) : Markus Hilpert et al.

It is certified that error appears in the above-identified patent and that said Letters Patent is hereby corrected as shown below:

In the Claims

In Claim 1, Column 12, Line 7, "determining the speed of at which" should be changed to --determining the speed at which--;

In Claim 6, Column 12, Line 33, "wave front the fluid pressure wave" should be changed to --wave front of the fluid pressure wave--.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*